Nov. 14, 1961 A. DE CARLO 3,009,128

COUPLING NUT PROVIDED WITH TERMINAL CONNECTOR

Filed Feb. 11, 1958

INVENTOR.
ANGELO DE CARLO

BY Frank M. Murphy

ATTORNEY

United States Patent Office 3,009,128

Patented Nov. 14, 1961

3,009,128

COUPLING NUT PROVIDED WITH TERMINAL CONNECTOR

Angelo De Carlo, 11 Parkview Drive, Bronxville, N.Y.

Filed Feb. 11, 1958, Ser. No. 714,523

2 Claims. (Cl. 339—13)

This invention relates to coupling nuts of the type commonly employed to connect electrical conduit to service boxes. Such coupling nuts are commonly provided with a terminal connector for use in grounding equipment within the box, and the invention relates particularly to the construction of terminals mounted on coupling nuts.

The coupling nuts heretofore used and known to me have the disadvantage that after they are in place within the service box, the terminal is frequently inaccessible or accessible only with difficulty. The coupling nut of the invention is characterized in that connection to the terminal can be made in alternate ways so that in general the connection can be conveniently made regardless of the position of the terminal within the box.

The features of the coupling nut of the invention will be apparent from a consideration of the accompanying drawing, in which.

Figure 1:
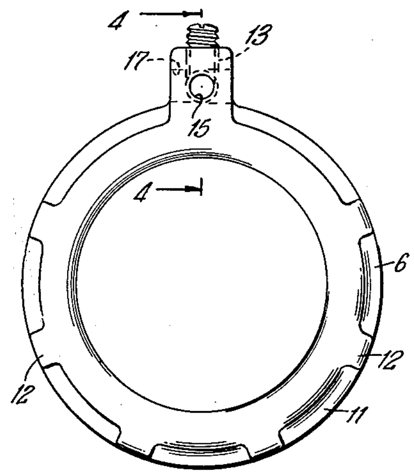
FIG. 1 is a front elevation of a coupling nut according to the invention.
Figure 2:
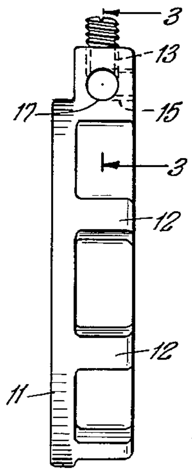
FIG. 2 is a side elevation of the coupling nut shown in FIG. 1.
Figure 4:
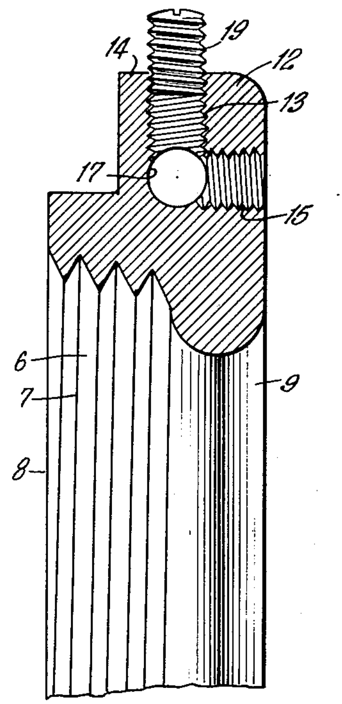
FIG. 4 is a cross-section taken along line 4—4 in FIG. 1.
Figure 3:
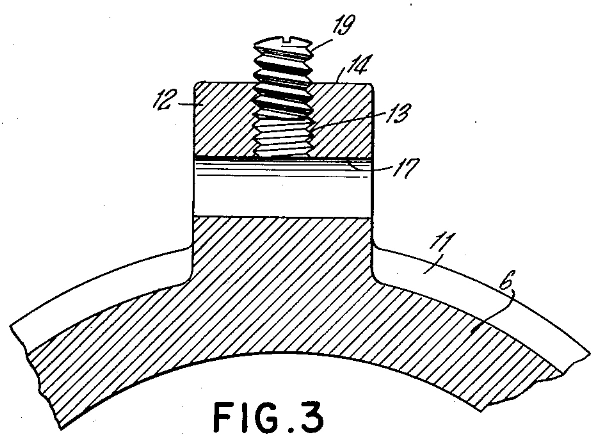
FIG. 3 is a cross-section taken along line 3—3 in FIG. 2.

Referring to the drawing, the fitting or coupling nut comprises a hollow cylindrical member 6 having internal screw threads 7 running from the leading end 8 of the fitting rearwardly to bead 9 which projects inwardly from the cylindrical member and provides an abutment for the end of a conduit onto which the fitting can be threaded. The fitting has an outwardly projecting flange 11 integrally joined to its leading edge 8, and longitudinally extending ribs 12 disposed at spaced intervals about the outer periphery of the cylindrical member and running from adjacent the bead 9 to the flange 11.

According to the invention a terminal is mounted outside and adjacent the cylindrical member in rigid and electrical connection therewith. The terminal comprises a block 12 which is integrally joined to the cylindrical member and has a radially extending passageway 13 extending from the top surface 14 of the block radially of the cylindrical member 6 to within the block, and an axially extending passageway 15 extending from the surface of the block remote from the leading edge 8 axially of the cylindrical member 6. The terminal block also has a through passageway 17 which extends completely through the block perpendicular to the radial passageway 13 and the axial passageway 15 and so that it intersects the radial and axial passageways. Each the radial passageway 13 and the axial passageway 15 is threaded, and preferbly these passageways intersect at the through passageway 17. Either the radial passageway or the axial passageway is provided with a set screw 19 for use in securing a conductor to the terminal.

Figure 5:
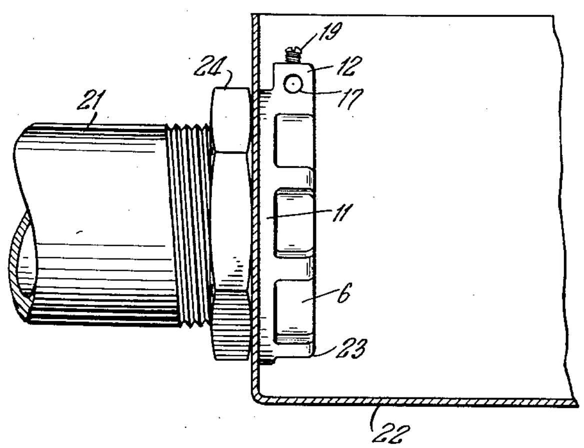
FIG. 5 is a view of a conduit leading into a service box shown in cross-section, the conduit being coupled to the service box by a coupling nut of the invention.

The operation of the coupling nut of the invention will be readily understood by reference to FIG. 5. A threaded electrical conduit 21 projects into a service box 22 and has coupling nut 23 threaded thereon so that the conduit is coupled to the box. A locking nut 24, also threaded onto the conduit, is disposed on the outside of the box and is manipulated so that the conduit and box are rigidly interconnected. Equipment within the box can then be grounded by inserting a ground wire from the equipment into the through passageway 17 from either end thereof and then threading the set screw 15 into either the radial passageway 13 or axial passageway 15, whichever is convenient, and tightening the set screw to obtain good electrical connection between the wire and the coupling nut.

Having now described my invention, I claim:

1. A fitting for connecting a threaded end of an electrical conduit to an electrical service box, said fitting comprising a hollow cylinder having screw threads for threading the fitting onto the threaded end of the conduit, a terminal mounted on the cylinder and integrally joined thereto, said terminal comprising a block having a radially extending passageway extending from a surface thereof radially of said cylinder to within said block, an axially extending passageway extending from a surface of said terminal block axially of said cylinder to intersection with said radially extending passageway, a through passageway extending completely through said block perpendicular to the radial passageway and the axial passageway and intersecting the radial passageway and the axial passageway, the radial and the axial passageway being threaded, a screw positioned in one of said threaded passageways, whereby with the threaded end of the conduit projecting into the service box the fitting can be threaded onto the conduit for connecting it to the box and the said terminal can be employed for grounding equipment within the box by inserting a ground wire into said through passageway from either end of the passageway according to accessibility and the ground wire can be secured in place by threading said screw through either of said threaded passageways according to convenience.

2. In combination, an electrical service box, means defining an opening in a wall of said box, an electrical conduit having a threaded end, said conduit projecting through the opening and having said threaded end terminating within the box adjacent said wall thereof, a fitting having screw threads threaded onto the threaded end of the conduit abutting the inner side of said wall, said fitting comprising a terminal mounted thereon and integrally joined thereto, said terminal comprising a block having a radially extending passageway extending from a surface thereof radially of the fitting to within said block, an axially extending passageway extending from a surface of said terminal block axially of the fitting, a through passageway extending completely through said block perpendicular to the radial passageway and the axial passageway and intersecting the radial passageway and the axial passageway, the radial and the axial passageway being threaded, a screw positioned in one of said threaded passageways, whereby with the threaded end of the conduit projecting through said box opening the fitting can be threaded onto the conduit for connecting it to the box and said terminal can be employed for grounding equipment within the box by inserting a ground wire into said through passageway from either end of the passageway according to accessibility and the ground wire can be secured in place by threading said screw through either of said threaded passageways according to accessibility.

References Cited in the file of this patent

UNITED STATES PATENTS

| | | |
|---|---|---|
| 850,836 | Hornsby et al. | Apr. 16, 1907 |
| 922,309 | More | May 18, 1909 |
| 1,590,590 | Seymour et al. | June 29, 1926 |
| 1,885,227 | Buchanan | Nov. 1, 1932 |
| 1,899,365 | Thomas | Feb. 28, 1933 |
| 2,304,167 | Hayes | Dec. 8, 1942 |
| 2,710,381 | Monson | June 7, 1955 |

FOREIGN PATENTS

| | | |
|---|---|---|
| 455,722 | Germany | Feb. 7, 1928 |
| 471,482 | Germany | Feb. 13, 1929 |